O. E. JENSON.
WALKING ATTACHMENT FOR MOTOR VEHICLES.
APPLICATION FILED JUNE 5, 1918.
1,298,953.
Patented Apr. 1, 1919.
2 SHEETS—SHEET 1.
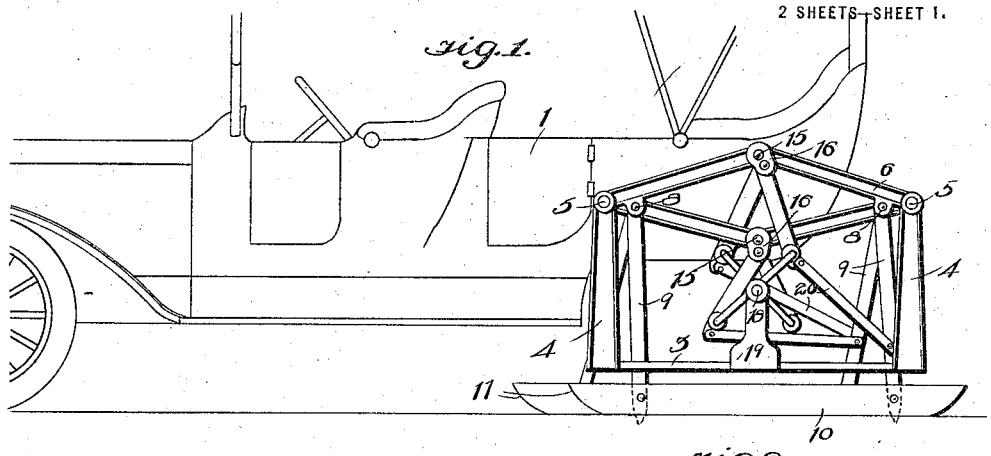
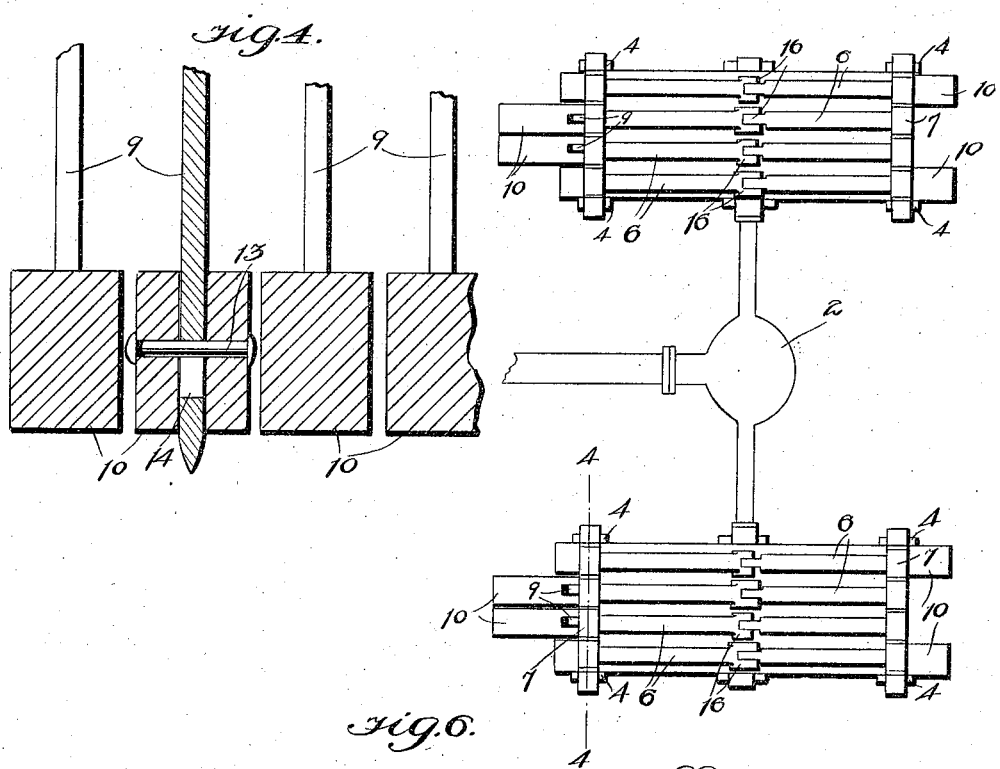
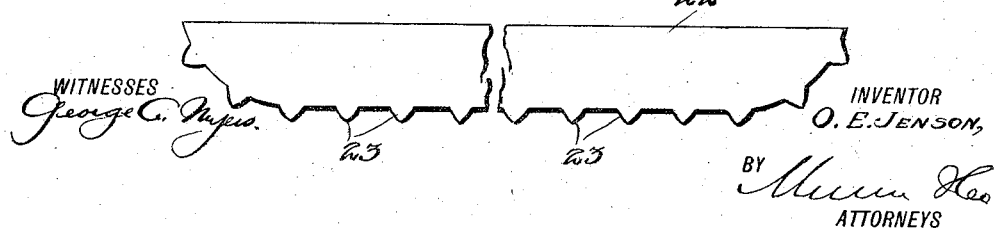
WITNESSES
INVENTOR
O. E. Jenson,
BY
ATTORNEYS O. E. JENSON.
WALKING ATTACHMENT FOR MOTOR VEHICLES.
APPLICATION FILED JUNE 5, 1918.
1,298,953.
Patented Apr. 1, 1919.
2 SHEETS—SHEET 2.
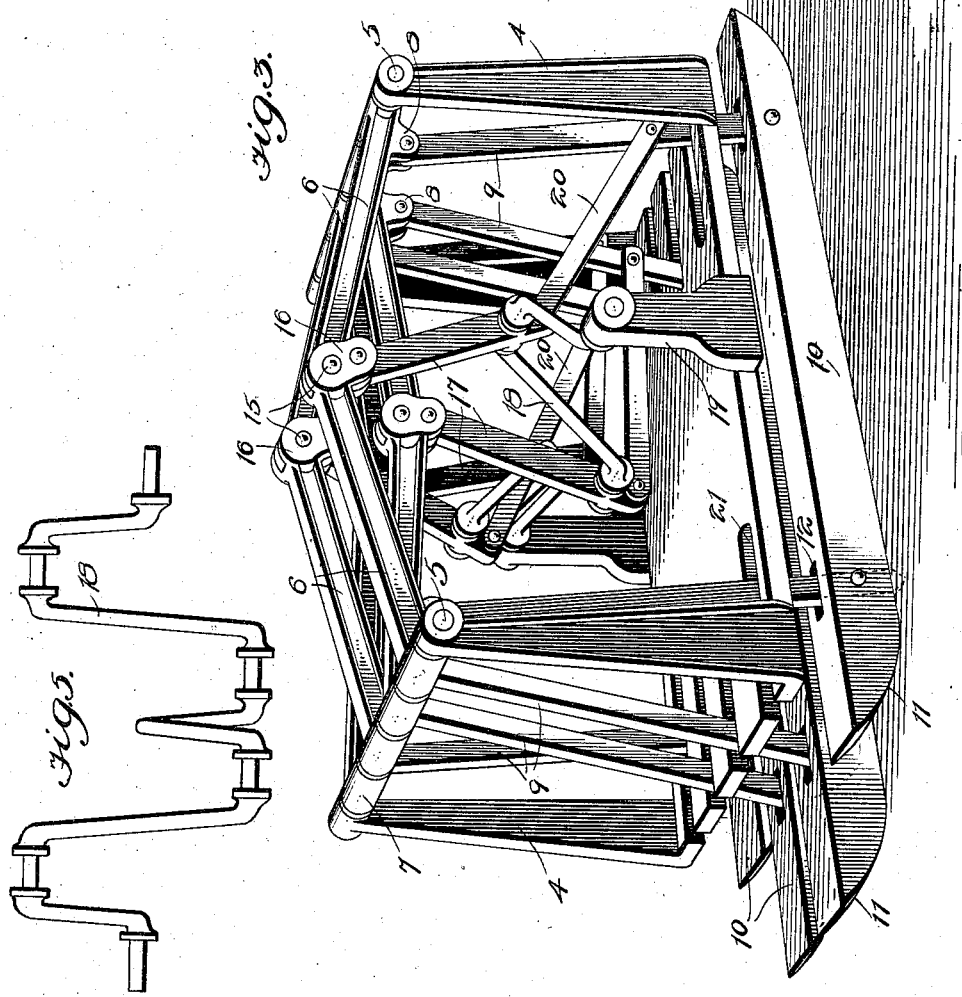
WITNESSES
INVENTOR
O. E. JENSON,
BY
ATTORNEYS

UNITED STATES PATENT OFFICE.

OLE EDWIN JENSON, OF ROSEBEG, ALBERTA, CANADA.

WALKING ATTACHMENT FOR MOTOR-VEHICLES.

1,298,953.   Specification of Letters Patent.   Patented Apr. 1, 1919.

Application filed June 5, 1918. Serial No. 238,391.

*To all whom it may concern:*

Be it known that I, OLE EDWIN JENSON, a subject of Great Britain, and a resident of Rosebeg, in the Province of Alberta and Dominion of Canada, have invented certain new and useful Improvements in Walking Attachments for Motor-Vehicles, of which the following is a specification.

My invention is an improvement in walking attachments for motor vehicles, and has for its object to provide a device of the character specified for attachment to motor vehicles such are are used to carry heavy loads or to draw trailers over rough roads or excessive grades, in order to obtain sufficient tractive force to propel the vehicle and its load without great loss of power.

In the drawings:

Figure 1 is a side view of a motor vehicle provided with the attachment;

Fig. 2 is a plan view of the attachment and the axle of the vehicle;

Fig. 3 is a perspective view of one section of the attachment;

Fig. 4 is an enlarged section taken substantially on the line 4—4 of Fig. 2;

Fig. 5 is a front view of the crank shaft;

Fig. 6 is a side view of a modified form of shoe.

The present embodiment of the invention is shown in connection with a motor vehicle 1 of usual construction, the device being attached to the rear axle which is arranged within the usual housing 2.

The attachment consists of two similar sections, one of which is adapted for attachment to each end of the axle. Each section comprises a frame consisting of a base plate 3 having at each corner a standard or upright 4, and a shaft 5 is journaled in these standards at each end.

A series of levers 6 is journaled on each shaft 5, each lever having a bearing 7 at its outer end which engages the shaft, and the levers extend inwardly toward each other. Near the shaft each lever has a pair of depending lugs 8, between which is received the upper end of a link 9, and the levers of the two shafts are arranged in pairs, so that there are four pairs of registering links.

A shoe 10 is supported by each pair of registering links, the said shoes being of a length to extend beyond the ends of the base 3, and the said shoes, which are of suitable cross section and material, have their lower corners rounded, as indicated at 11. Each shoe has a vertical slot or mortise 12, and the lower ends of the links are received in these slots or mortises. A rivet 13 connects each link with the shoe, and the connection is a lost motion connection, each link having a slot 14 through which the rivet passes. The slot is so arranged that when the rivet is at the upper end of the slot the link will extend below the shoe, as shown in Fig. 4, in position to dig into the supporting surface for the attachment, to insure a good grip on said surface, and when the rivet is at the lower end of the slot the lower end of the link will be approximately flush with the under surface of the shoe.

The inner adjacent ends of each pair of registering levers 6 are pivotally connected as indicated at 15, and at the pivotal connection one lever of each pair has a pair of depending lugs 16 between which is received the upper end of a pitman 17. A crank shaft 18 is journaled in bearing standards 19 at the opposite sides of the base 3, and this crank shaft has a crank for each pitman 17, that is, for each pair of levers. The lower end of each pitman 17 is journaled on the adjacent crank, and the pitman extends below the crank, as shown. A link 20 pivotally connects this extended lower end of the pitman to the adjacent link 9 at the rear of the attachment section, that is, there is a connection between each pitman below the crank shaft and the adjacent link 9 at the rear of the section.

One section of the device is arranged at each end of the rear axle, and the crank shaft is a continuation of the axle spindles, being connected therewith in any suitable manner, or the said crank shaft may be made integral with the axle, if desired, for permanent use. Referring to Fig. 5 it will be noticed that there are four cranks to the crank shaft, the said cranks being arranged in pairs, the pairs being at opposite sides of the crank shaft. One pair consists of the two central cranks and the other pair of the two outer cranks.

In use, when the crank shaft 18 is rotated the inner ends of the levers 6 will be raised and lowered, raising and lowering the links 9. As the crank shaft rotates, the pairs of shoes will be lifted, moved forwardly, downwardly and rearwardly, each pair being so moved for each complete rotation of the shaft, and the two pairs will be moved in alternation, one moving forward while the other is moving backward. Thus each pair of shoes, once during each complete rotation of the crank shaft, will be lifted and moved forwardly to a new position and will be moved down into contact with the ground at the moment when the other pair is being lifted. The rear end of the vehicle will thus be moved forwardly step by step, the motion simulating that of walking. The crank shaft lifts and lowers the shoes, while the links 20 move them forwardly. As each crank moves forwardly over the shaft, the shoe will be pulled forwardly by the link 20.

It will be noticed, referring to Fig. 3, that the ends of the base 3 are recessed, as indicated at 21, to permit the free movement of the links 9. A much better traction is secured by the use of the shoes than by the use of wheels, and there is no slippage. The forward movement of each pair of shoes insures a firm grip and a lifting movement of the vehicle, which will disengage the rear pair of shoes to permit them to be moved forwardly in turn.

In Fig. 6 is shown a modified construction of shoe, the said shoe 22 having on its under surface and at its rounded end spurs or lugs 23 for insuring a better grip on the ground.

I claim:

1. A device of the character specified, comprising similar sections adapted for connection with the ends of the rear axle of the vehicle, each section comprising a supporting frame, shafts journaled at the ends of the frame, a series of levers journaled on each shaft and extending inwardly toward each other, a crank shaft journaled transversely of the frame below the connected ends of the levers and having a crank for each pair of levers, a pitman connecting the adjacent ends of each pair of levers to the adjacent crank, a link depending from each lever near the adjacent shaft, a shoe arranged below the frame and extending longitudinally thereof and supported by each pair of links, and a link connecting each crank with the adjacent supporting link for the shoe at the rear of the section, the connection between each link and the shoe being a lost motion connection, and the link being of a length to extend below the shoe when the shoe is in its highest position with respect to the link and to be flush with the bottom of the shoe when the shoe is in its lowest position with respect to the link.

2. A device of the character specified, comprising similar sections adapted for connection with the ends of the rear axle of the vehicle, each section comprising a supporting frame, shafts journaled at the ends of the frame, a series of levers journaled on each shaft and extending inwardly toward each other, a crank shaft journaled transversely of the frame below the connected ends of the levers and having a crank for each pair of levers, a pitman connecting the adjacent ends of each pair of levers to the adjacent crank, a link depending from each lever near the adjacent shaft, a shoe arranged below the frame and extending longitudinally thereof and supported by each pair of links, and a link connecting each crank with the adjacent supporting link for the shoe at the rear of the section.

3. A device of the character specified, comprising similar sections adapted for connection with the ends of the rear axle of the vehicle, each section comprising a supporting frame, shafts journaled at the ends of the frame, a series of levers journaled on each shaft and extending inwardly toward each other, a crank shaft journaled transversely of the frame below the connected ends of the levers and having a crank for each pair of levers, a pitman connecting the adjacent ends of each pair of levers to the adjacent crank, a link depending from each lever near the adjacent shaft, a shoe arranged below the frame and extending longitudinally thereof and supported by each pair of links, and a link connecting each crank with the adjacent supporting link for the shoe at the rear of the section, the connection between each link and the shoe being a lost motion connection.

OLE EDWIN JENSON.

Witnesses:
H. O. KNOWLES,
J. S. MACKENZIE.